United States Patent [19]

Grossstück et al.

[11] Patent Number: 4,528,007

[45] Date of Patent: Jul. 9, 1985

[54] ELEMENT FOR SEPARATING GASEOUS ISOTOPES INTO AT LEAST TWO FRACTIONS AND WITH A SEPARATING BASKET CONSISTING OF SEVERAL SEPARATING ELEMENTS

[75] Inventors: Werner Grossstück, Pforzheim; Rainer Schäfer, Sprockhövel, both of Fed. Rep. of Germany

[73] Assignee: NUSTEP Trenndüsen Entwicklungs- und Patentverwertungsgesellschaft mbH & Co. KG., Essen, Fed. Rep. of Germany

[21] Appl. No.: 517,064

[22] Filed: Jul. 25, 1983

[30] Foreign Application Priority Data

Jul. 23, 1982 [DE] Fed. Rep. of Germany ....... 3227622

[51] Int. Cl.$^3$ .............................................. B01D 59/00
[52] U.S. Cl. .......................................... 55/395; 55/17
[58] Field of Search ................... 55/17, 277, 392–398

[56] References Cited

U.S. PATENT DOCUMENTS

| | | | |
|---|---|---|---|
| 3,362,131 | 1/1968 | Becker | 55/17 |
| 3,708,964 | 1/1973 | Becker et al. | 55/392 |
| 4,285,705 | 8/1981 | Niemann | 55/277 |
| 4,844,782 | 8/1982 | Grossstück | 55/397 |

OTHER PUBLICATIONS

S. Villani, *Uranium Enrichment*, Springer Verlag, 1979, pp. 256–259.
Achema-Frankfurt, 20–27 Jun. 1973, Uranium-235, Enrichment by the Separation Nozzle Process-a German Alternative, Becker et al.

*Primary Examiner*—Charles Hart
*Attorney, Agent, or Firm*—Nils H. Ljungman

[57] ABSTRACT

A separating element for gaseous isotopes into two fractions, and consisting of several elongated separating chips with a row of entry openings for the process gas at one side of the chips and a row of exit openings for the heavy fraction at the other side of the chips, with exit openings for the light fraction at the edges of the chips, and of two tubes holding the chips and having at least one chamber, with said tubes being connected by means of connecting elements, and equipped with entry and exit openings on their contact surfaces, with said entry and exit openings arranged in rows in a longitudinal direction of the chips, and for simplifying of installation and construction, this invention provides that the chips are arranged in a longitudinal direction to the tubes, with their sides abutting directly against the smooth contact surfaces of the tubes, and whereby the connecting elements are positioned in one row in the center of the two tubes.

13 Claims, 8 Drawing Figures

ELEMENT FOR SEPARATING GASEOUS ISOTOPES INTO AT LEAST TWO FRACTIONS AND WITH A SEPARATING BASKET CONSISTING OF SEVERAL SEPARATING ELEMENTS

BACKGROUND OF THE INVENTION

The invention relates primarily to a separating element for the separation of gaseous isotopes into at least two fractions.

According to the *Handbook of Inorganic Chemistry* by Gmelin, *Uranium Supplement*, part A 2, a separating element is known whereby a large number of separating nozzle structures for single reversing systems are etched into a metallic foil, together with gas conduits for the process gas, as well as the heavy fraction medium by means of photographic etching. By stacking of such foil, so-called separating nozzle chips are obtained, which are then fitted with cover plates on both sides. The initial process medium is introduced through holes in one cover plate, whereas the heavy fraction is removed through holes from the other cover plate. The light weight fraction runs off at the longitudinal edges of the foil package. By entering such elongated chips between two half-tubes, which are used for supplying the process gas, as well as delivering the heavy fraction, a tubular separating element has been created. Known separating elements are held by means of screws, which act as special connecting elements to hold the foil layers between the metallic cover plates. The chips are placed between the two half-tubes in such a way that they stretch in a lateral direction to the longitudinal position of the half-tubes. The openings are fitted with circular seals of soft material, which seal the outer areas of the separating chips to the outside. The half-tubes are fitted with flanges, which are bolted together after the separating nozzle chips are inserted. This method of connecting the half-tubes at the outer edges has the disadvantage that an insufficient seating pressure is obtained in the middle range. In addition, the manufacturing of separating elements is made more difficult by using soft seals and the use of special connecting elements for the chips. When using the separating element for separating isotope compounds in a $UF_6$ mixture, it was found that the soft sealing material had been corroded. This construction method necessitates also extensive erection periods.

A separating element with a separating nozzle chip of foils has been developed whereby the individual foil layers are welded, soldered, or glued together (DE-AS 20 09 265; BO1D, 53/24). However, only a single structure of foil layers is positioned between two flanges.

Through DE-OS 30 06 527 (BO1D 59/18), a process has become known whereby a lithographic process uses X-rays and especially synchroton radiation, to form several layers with separating nozzle structures in such a way that, after achieving the necessary thickness for a separating nozzle structure, a monolithic structure has been formed. No indication is given in DE-OS 30 06 527 to show how several of these separating nozzle chips with media supply conduits or fraction delivery conduits are to be connected.

SUMMARY OF THE INVENTION

The invention in its broad form consists of an apparatus for separating gaseous isotopes into at least two fractions comprising:

several elongated separating nozzle chips with at least one row of entry openings for the process gas at one side of the chips, and at least one row of exit openings for the heavy fraction at the other side of the chip, and exit openings for the light fraction at the edges of the chips, and of two tubes which form at least one chamber each and which hold between their flat surfaces the chips, which are connected by a series of connectors which are in alignment with the entry openings for the process gas, or the exit openings for the heavy fraction, and whereby the rows of entry openings and exit openings in the chips are arranged in a longitudinal direction, and wherein the chips are arranged in a longitudinal direction of the tubes and which abut with their sides directly against the flat holding surfaces of the tubes, whereby the connecting elements are arranged centrally in one row between the two tubes.

On the basis of a separating element, this invention sets out to improve the above named element, whereby the separating element is to be simplified and the life of the element extended.

This task is solved by placing the chips longitudinally to the tubes and to seat the chips directly against the flat holding surfaces of the tubes, whereby the connecting elements are located in one line along the center of the tubes.

This arrangement makes it possible to dispense with the special soft seals which show critical reactions during cleaning with fluorine and when in contact with $UF_6$. No dismantling of the separating element after cleaning with fluorine for replacement of seals is therefore necessary.

It is desirable that the chips consists of the customary package of separating nozzle structures, together with cover layers on both sides of the foil package and held together by the connecting elements of the two tubes.

The traditional cover plates and the special chip connectors can hereby be dispensed with. The connecting elements of the tubes will take care of holding the foil package together.

The invention makes it possible to use to advantage the chip foil structure in packaged form and connected as described above.

Separating nozzle chips of specially structured foil materials, as well as chip packages, should have at least one spot at which such connecting elements penetrate each chip for the two tubes.

In this way, a number of chips can be arranged on the seating surface of the tube for placement of the second tube before completing the final connection.

Although a number of connecting elements are suitable, such as bolts, riveting is still the preferred method because of the penetration of the rivet through all components.

It is also advantageous to reinforce the wall of a tube in the area of the chip package and to finish machine its surface. In such case, the effect on density of the contact points can be improved.

Although the passages in the tubes are to serve the supply and discharge of gases to and from the chips, and any conduit can be fashioned individually, it is preferable for manufacturing purposes, to arrange the conduits in the tubes in the form of longitudinal slots.

An excellent method of producing such tubes is the extrusion method. It is preferred in that the tube cross section includes the wall section suitable for seating, with well rounded connecting sections to blend into the main tubular shape.

In order to stiffen the tube, and in order to achieve a division into separate chambers of the tubing, it is desirable to equip the two tubes with a longitudinal inner rib which divides the tubes into at least two chambers.

For a single reversing system, as described at the beginning of this patent description, a partition of the tubes into several chambers is not required. For a separating nozzle design where, in addition to the heavy and the light fraction, a medium fraction is being separated, it is preferable to equip the exit hole side for the heavy fraction with additional exit openings for a medium fraction and to equip the tubing at that side with at least two longitudinal ribs which divide the tube into two outer chambers for a heavy fraction and a centrally located chamber for a medium fraction.

The ribs in this design are to stiffen the tube proper, as well as protect the tubing against loads incurred by the connecting elements.

The invention makes reference to a separating basket wherein: the separating elements in an inner chamber are attached by means of head and tail flanges through openings in the bottom and the cover, and whereby each separating element is closed at least at one end, and the basket space not occupied by the separating elements is used for collecting light fraction media, and wherein several separating elements are arranged between each pair of flanges. A separating basket of such design has been described by S. Villani, *Uranium Enrichment*, Springer Verlag, Berlin, Heidelberg, New York (1979), pp. 257-259, especially FIGS. 5.13 and 5.15. The separating basket described in FIG. 5.3 for a given separating step, consists of a ten-chamber tube between each head and bottom flange, with separating slots in longitudinal direction of the tube which consists of mechanically produced components.

Experience has shown that the above mentioned separating basket has several separating elements between each flange pair and arranged according to the invention.

A double reversing system will also provide for a third flange between the two flanges whereby both tubes penetrate the third flange and are sealed gastight with one end of the exit tube protruding into the gap between one flange and the third flange.

Because the longitudinal chips are positioned in line with the tubes, a reduction of volume requirements at a given separating slot length can be achieved, since a cylindrical arrangement of several separating elements between the two flanges form a single unit, with the center line of the separating elements in a radial and/or tangential direction in relation to the cylinder position. A tight packing of the separating elements in the separating basket is thereby assured.

BRIEF DESCRIPTION OF THE DRAWINGS

The invention shall now be explained in detail by means of the illustrations enclosed.

DESCRIPTION OF THE PREFERRED EMBODIMENTS

Figure 1:
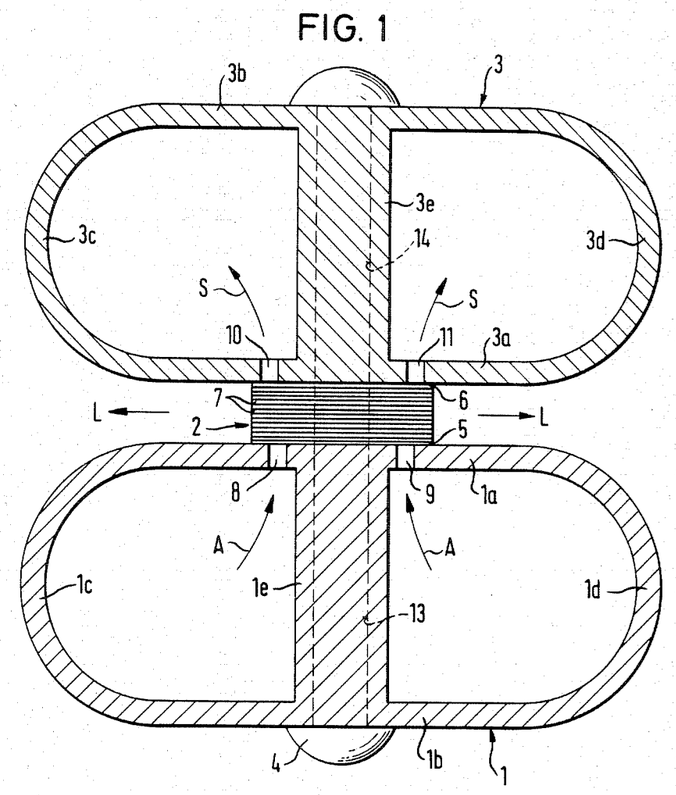
FIG. 1 shows a section through the separating element for single reversing, in accordance with the invention.

The separating element shown in FIG. 1 consists of a supply tube for the process gas A, a separating nozzle chip 2, a discharge tube 3 for heavy fraction S of the process gas, and the rivets which penetrate both tubes and the tubes with the connecting rivets 4 for the separating nozzle chip.

The design shown consists of a separating chip with two covering foil layers 5 and 6 and several structural textured foil layers 7. The structural foil layers 7 contain single reversing separating nozzles in the edges, but which are not shown here. They are similar to the left hand illustration shown in FIG. 2-52 of "Gmelin: Handbook of Inorganic Chemistry". As this invention does not concern itself with special separating nozzle designs, but with the connection of separating nozzle chips with the tubes, specific separating nozzle designs are not specifically described in this application. This also applies to double reversing systems, as depicted in principle in FIG. 2-48 of the literature described above. The cover foil layers do not contain separating nozzle structures, but only the respective supply openings to the so called "bubbles" of the individual separating nozzle arrangements.

As can be seen in FIG. 1, the separating tube 1 consists of a contact wall section 1a, an opposite parallel wall section 1b, and two connecting wall sections 1c and 1d. Wall section 1b is connected with wall section 1a by a centrally located rib 1e.

In the area of covering layer 5, which contains openings for the process gas, wall section 1a is equipped with openings 8 and 9, which funnel process gas A into the separating nozzle chip 2.

Cover layer 6 at the opposite side of the separating nozzle chip is equipped with outlets for the heavy fraction S. Contact wall section 3a of tube 3 has passages 10 and 11, through which the heavy fraction S enters the inside of tube 3. As FIG. 2 shows, openings 8, 9, 10 and 11 are slots in the longitudinal direction of the tubes and require a chip for contact surface 12 on the tube.

Rivets 4 are located in drill holes 13 or 14 of their respective wall sections and ribs 1e and 3e.

Since a division of the inner space of tubes 1 and 3 into several chambers is not required for a single reversing element, ribs 1e and 3e could be deleted, when wall sections of the tubing are sized in such a way that they can resist the required sealing pressure which is produced by rivets 4.

Figure 2:
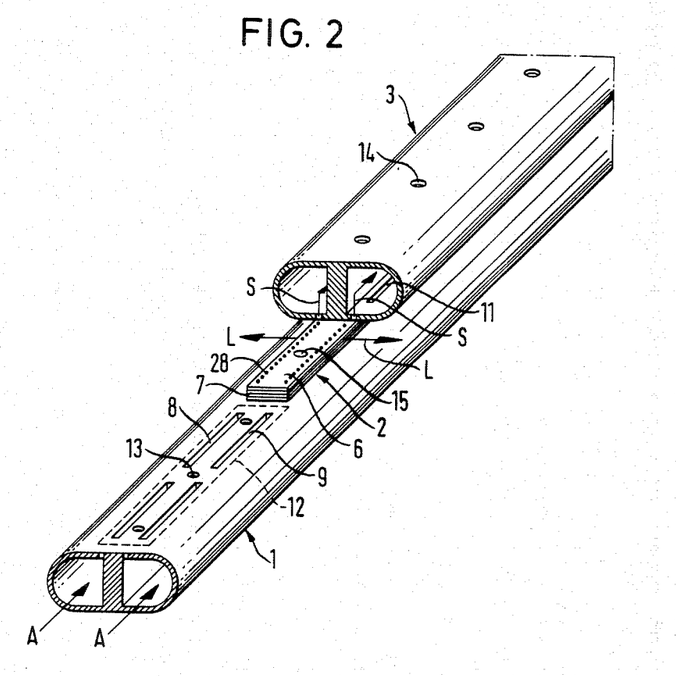
FIG. 2 shows a partial perspective of the separating element, according to FIG. 1.

FIG. 2 shows that separating chips 2 are located longitudinally to the tubes.

The design shows that a given separating chip covers two openings each, such as 8, 9 or 10, 11, and is penetrated by rivets in three holes 15. During assembly of the separating element, the rivets are pushed through holes 13 in bottom tube 1, the foil layer structure of the separating chips 2 are threaded, tubing 3 is positioned and the package is riveted.

As FIGS. 1 and 2 show, the width of the contact surface for tubes 1 and 3 is larger than the width of the contact surface of the individual separating chips 2. This method will assure that the sealing or tightening pressure on both sides of the separating chip are adequate for the required sealing pressures.

Figure 3:
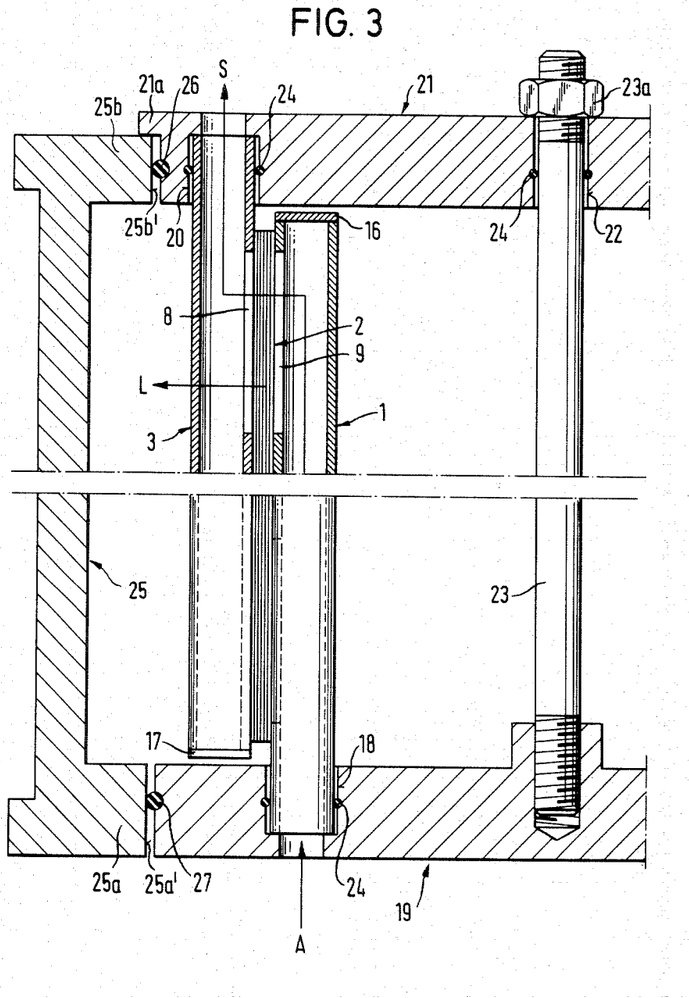
FIG. 3 shows a partial section through a separating basket with separating design groups and separating elements, according to FIG. 1.
Figure 4:
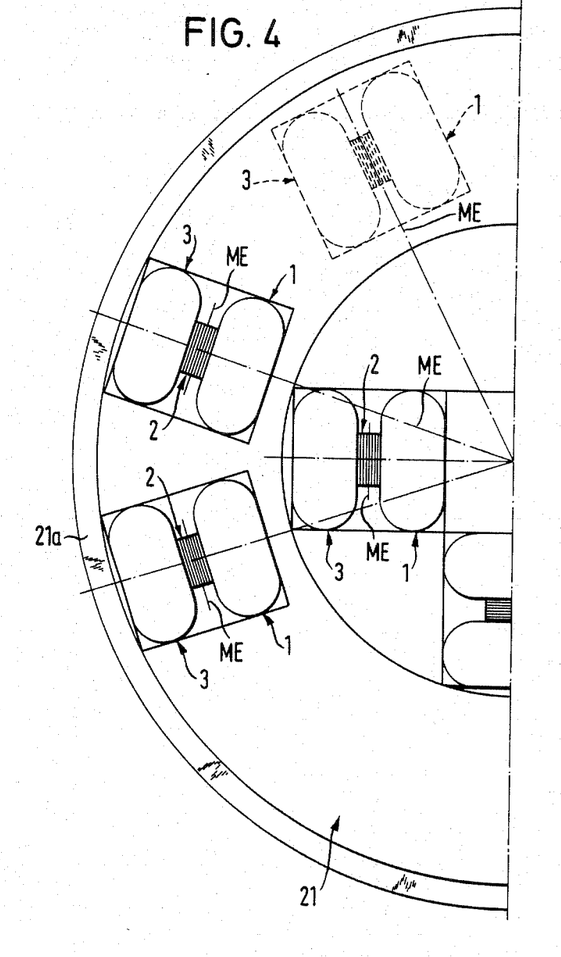
FIG. 4 shows a partial section through a separating group, to explain various possibilities of arranging separating elements within a design group.

The design of a separating element unit shall be explained in terms of FIGS. 3 and 4. As FIG. 3 shows, supply tube 1 is closed at one end by cover 16, whereas the respective end of tube 3 will be longer than the closed end of tube 1, and remain open. Tube 3 shall be closed by a cover 17 at its other end, and protruded by the open end of tube 1. The extended end of tube 1 penetrates into a step-machined axial bore 18 of flange 19 (bottom flange), whereas the open end of tube 3 fits into a step-machined axial bore 20 of flange 21 (head flange), whereby during tightening of tie rod 23, which passes through flange 19, and bore 22 of flange 21, thereby making sure that by the turning of nut 23a, separating elements are secured tightly between the two flanges. Bores 18, 20 and 22 contain gas seal rings 24.

FIG. 4 shows that several separating elements can be arranged differently between flanges 19 and 21. Preferred arrangements are those, where center line ME of each separating element is parallel to the center line of the tie rod (dotted line), or vertical (solid line) to it. Combination arrangements are a good possibility.

As FIG. 3 shows, bottom flange 19 and head flange 21 with bottom 25a or cover 25b of separating basket 25 are arranged as shown in the publication by S. Villani, which should again be mentioned. Step 21a in head flange 21 prevents a drop of the separating group through opening 25b' and cover 25b into the basket. The arrangement of the separating groups in the bottom or cover of the basket can be seen in FIG. 5-15 of Villani's publication. To achieve a gastight connection between flanges 19 and 21 of the separating element group, as well as openings 25a' and 25b' of basket 25, seal rings 27 and 26 are used.

FIG. 3 shows process gas A, light fraction L and heavy fraction S by means of arrows.

Figure 5:
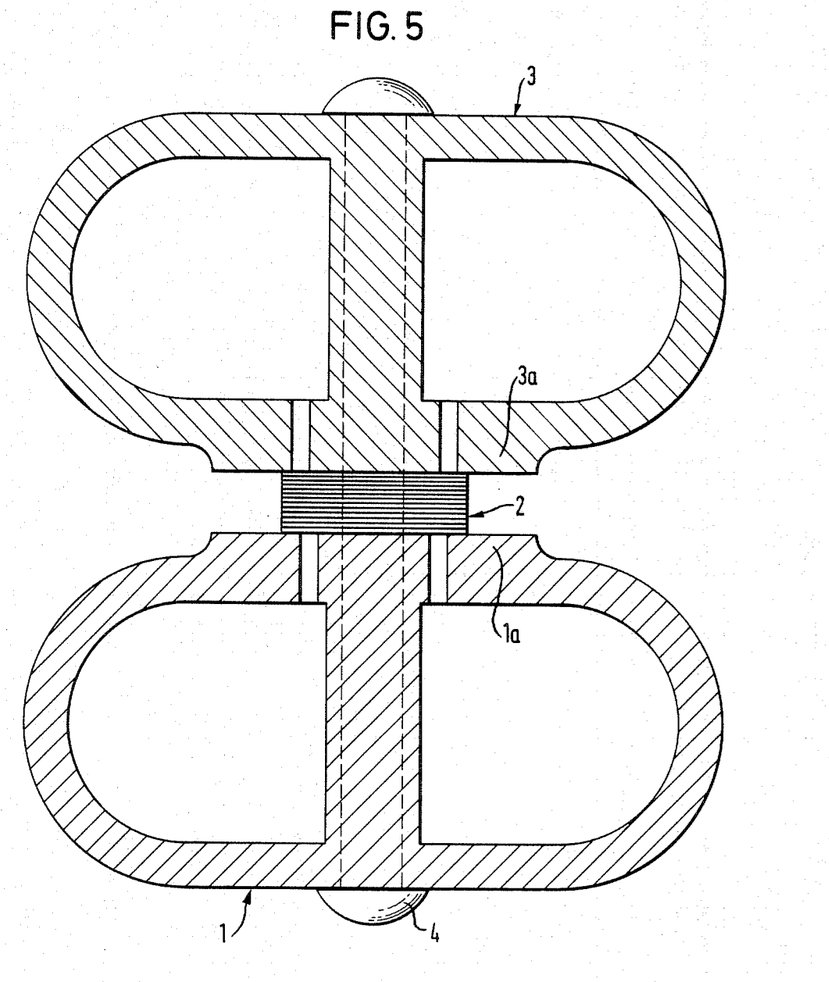
FIG. 5 shows a separating element similar to FIG. 1, with reinforced wall in the area of contact.

The design shown in FIG. 5 for a single reversing system, is differentiated from the design shown in FIG. 1, by the increased wall thicknesses 1a or 3a, and a special machining operation for the contact surfaces, which could be lapped.

Figure 6:
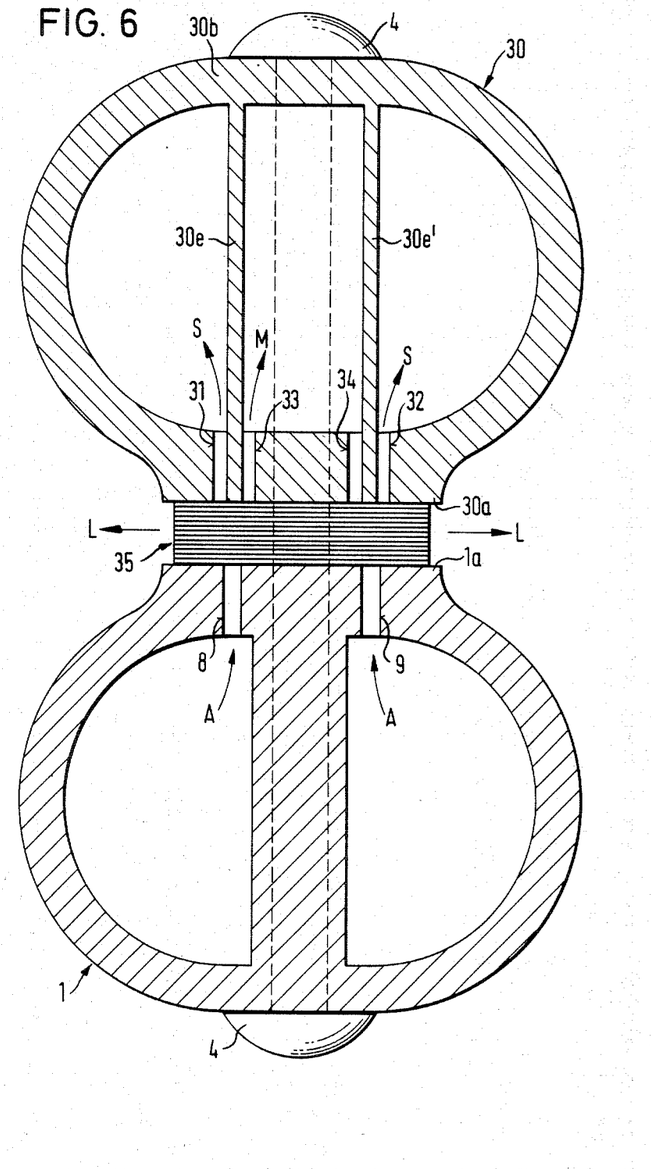
FIG. 6 shows a section through a separating element for double reversing.
Figure 7:
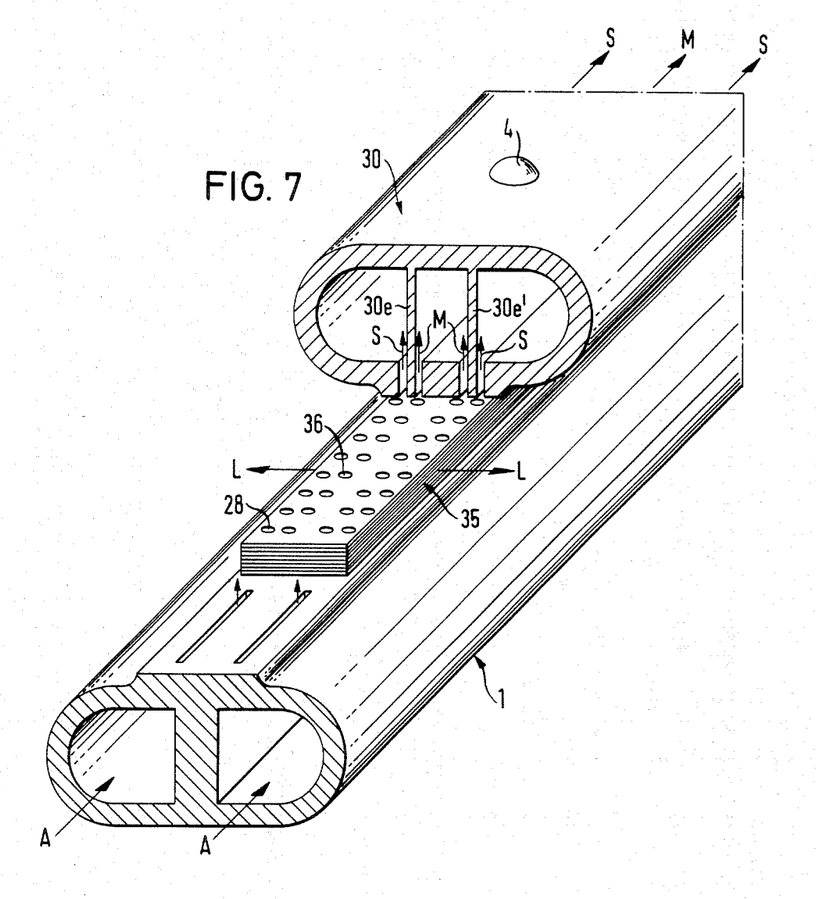
FIG. 7 shows a perspective, similar to FIG. 2, for double reversing separating element, similar to FIG. 6.
Figure 8:
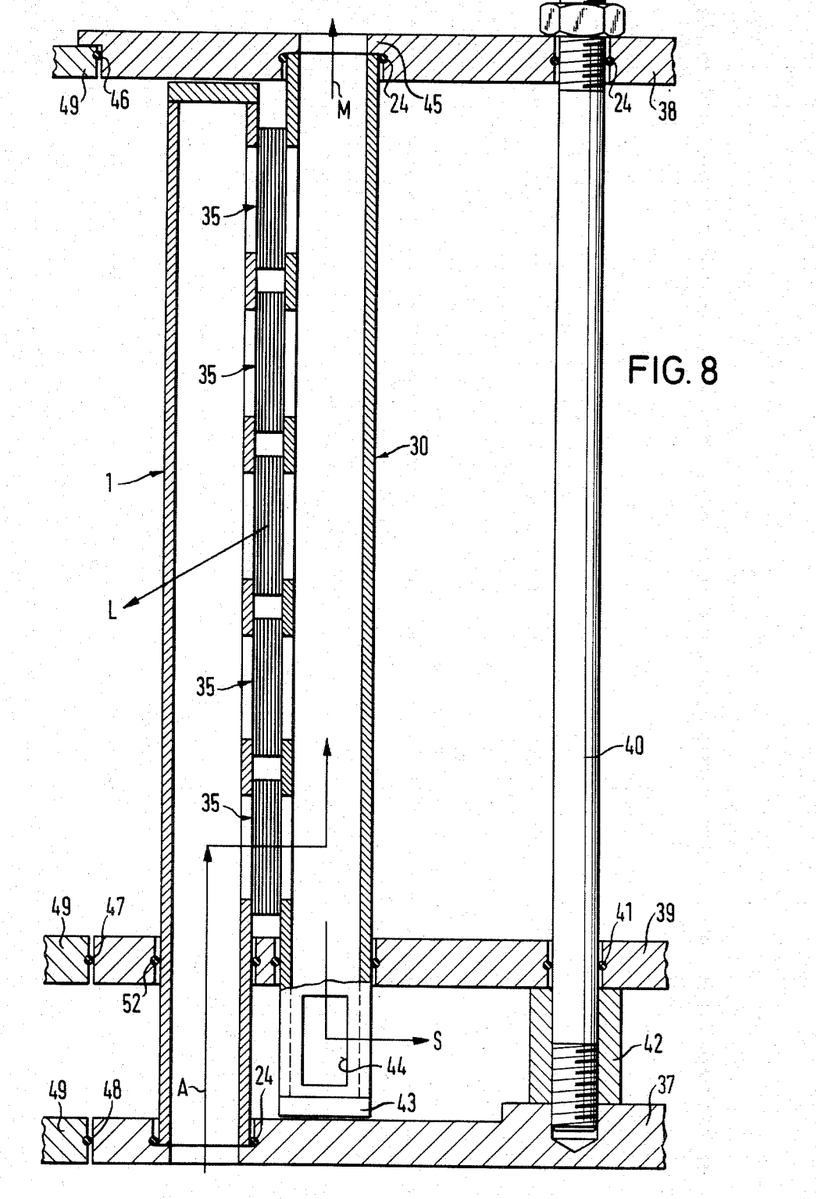
FIG. 8 shows a partial longitudinal section, similar to FIG. 3, for double reversing separating group, similar to FIG. 6 or 7.

The separating elements, according to FIGS. 6, 7 and 8, are designed for a double reversing method. For comparable elements, the same criteria, as shown in FIG. 1, are used. Instead of exhaust tube 3, discharge tube 30 is now used, whereby two ribs 30e and 30e' are divided into two outside chambers for the heavy fraction S and a middle chamber for medium fraction M. Heavy fraction S is hereby guided through wall sections 30a with entry to the chambers S by means of openings 31 and 32. Between openings 31 and 32, two passages 33 and 34 exists, which channel the marginal double reversing separating nozzle structure of the medium fraction into the chambers 30e and 30e'. The light fraction L is then exhausted over the edges of foil separating chips 35.

A comparison of FIG. 2 with FIG. 7 shows that cover foil layer 6 of two separating nozzle chips has only a few exit openings 18 for the heavy fraction from remaining separating structures, which exhaust to the top, whereas the respective cover layer of separating chip 35, in FIG. 7, shows additional openings 36 for medium fraction M.

FIG. 8 shows, in schematic, how a separating group should look, when using FIGS. 6 and 7. FIG. 8 shows a third flange between bottom flange 37 and top flange 38, which is similar to flanges 19 and 21 in FIG. 3. This third flange 39 is held by a tie rod 40, which connects flange 37 and seal 41. Between flange 37 and 39, a spacer bushing 42 is placed, which is guided by the tie rod.

FIG. 8 shows that supply tube 1 is supported by a step bore of flange 37 and passes through the center flange 39 with a seal ring 52 in between.

Discharge tube 30 is partially closed at the ends. The design shown indicates the end between flanges 39 and 37 closed with a cover plate 43. The chambers for the heavy fraction S have side openings 44 towards the end, which enable the heavy fraction S to exit between flanges 39 and 37. Instead of the side openings, it is also possible to cover only the space over the center chamber by means of a cover.

The end of discharge tube 30, which enters through a step-bore of top flange 38, is covered by means of a cover 45 over the heavy fraction media, thereby allowing the medium fraction M to enter the space above flange 38, where it can be collected and disposed. Basket 49, which is similar to basket 25, and shown in FIG. 8, is sealed by means of seal rings 46, 47 and 48, and used for double reversing separation.

Also with double reversing separation elements, different arrangements in assemblies are possible.

The tube equipped with rib, see tube 1 and 3, as well as the tube 30 equipped with two ribs, can be produced by continuous casting or extrusion process. To improve the seal between the separating chip and the respective contact surfaces, the contact surfaces for the tubes can be finish machined after the tubes are completed.

The invention as described hereinabove in the context of a preferred embodiment is not to be taken as limited to all of the provided details thereof, since modifications and variations thereof may be made without departing from the spirit and scope of the invention.

We claim:

1. Apparatus for separating gaseous isotopes into at least two fractions comprising:

a number of elongated separating nozzle chips having on one side entry openings for introduction of a gas to be processed into said chips, on another side first exit openings for discharging the heavy fraction from said chips and at least at one edge second exit openings for discharge of said light fraction from said chips;

first and second elongated tubular members each having at least one chamber;

said elongated tubular members being disposed on opposite sides of said chips with said chips secured therebetween;

said first elongated tubular member having passageway means connecting its said chambers with said entry openings for introducing said process gas into said chips;

said second elongated tubular member having passageway means connecting its said chambers with said first exit openings for receiving said heavy fraction from said chips;

said chip entry openings extending generally in a longitudinal direction;

said chip first exit openings extending generally in a longitudinal direction; and connecting means securing said assembly.

2. The separating apparatus of claim 1 wherein:

said chips each includes a plurality of foil layers having separating nozzles and cover foil layers; and said connecting means securing the chip assembly between said first and second elongated tubular members.

3. The separating apparatus of claim 1 including said chips each having a pair of spaced lines of said entry openings and a pair of spaced lines of said first exit openings.

4. The separating apparatus of claim 3 wherein said connecting means include a plurality of mechanical fasteners, and at least one said mechanical fastener passing through each said chip between said lines of entry openings.

5. The separating apparatus of claim 3 wherein said connecting means include rivets passing through said elongated tubular member.

6. The separating apparatus of claim 1 including reinforcing means supporting the wall portion of said elongated tubular members which are disposed adjacent to said chips.

7. The separating apparatus of claim 6 including said tubular member passageway means having longitudinal slots oriented generally in the same direction as the longitudinal extent of said tubular members.

8. The separating apparatus of claim 7 including said tubular members having a cross-sectional configuration including a generally flat chip supporting surface, a spaced generally parallel flat surface and a pair of curved connecting surface.

9. The separating apparatus of claim 6 wherein:

said reinforcing means include longitudinal rib means disposed within the chamber of each said tubular member; and said rib means divide said chamber into two subchambers.

10. The separating apparatus of claim 1 wherein:

said chip means have a series of third exit openings for discharge of a medium fraction of said gas to be processed to said second elongated tubular member; and said second elongated tubular member having one outer chamber for receipt of said heavy fraction and another outer chamber for receipt of said medium fraction.

11. The separating apparatus of claim 1 wherein:

a plurality of separating systems of claim 1 are secured within a separating basket;

each said elongated tubular member in each of said separating systems being closed at one end;

said separating basket has a bottom wall, a cover wall and a connecting lateral wall cooperating to define a basket chamber;

flange means securing said separating system to said basket; and said basket chamber having space for receipt of said light fraction.

12. The separating apparatus of claim 11 wherein:

said flange means includes a first flange for receiving a portion of one said elongated tubular member of a said separating system and a second flange for receiving another portion of the said elongated tubular member of a said separating system;

a third flange disposed between and in spaced relationship with respect to said first and second flanges;

said elongated tubular members passing through said third flange; and seal means interposed between said elongated tubular members and said third flange.

13. The separating apparatus of claim 12 wherein:

said separating systems are positioned with respect to each other so as to be in a generally cylindrical arrangement, such that, a plane generally parallel to and passing through one of said chips will be generally perpendicular to a radius of said cylinder.

* * * * *